Aug. 13, 1968     T. L. WHITE     3,396,543

TUNNEL LINERS

Filed March 17, 1966

INVENTOR
Thomas L. White

United States Patent Office 3,396,543
Patented Aug. 13, 1968

3,396,543
TUNNEL LINERS
Thomas L. White, Youngstown, Ohio, assignor to Commerical Shearing & Stamping Co., a corporation of Ohio
Filed Mar. 17, 1966, Ser. No. 535,093
4 Claims. (Cl. 61—45)

This invention relates to tunnel liners and particularly to segmental metal liner plates for supporting the earth load around the tunnel. It has long been the practice in tunnel boring to place a metal lining within the tunnel inside the tailskin of the shield. Grout is pumped through openings in the liner to fill the voids between the liner and the earthen walls of the tunnel.

One of the persistent difficulties which has existed with this tunnel liner art is that of water seepage through the grout and liners, particularly when the tunnel is beneath a river or other body of water. Many efforts have been made to overcome this water leakage problem. These efforts have primarily been directed to inserting resilient preformed gaskets between the several liner plates as they are assembled. These practices have not been entirely satisfactory because of the difficulty of holding the gasket in the proper place while bolting up the segments.

I have invented a tunnel liner plate and method of assembly which overcomes this problem of water leakage and which eliminates the need for preformed gaskets and the problems associated with their placement.

In a preferred embodiment of my invention, I provide a liner plate having generally parallel spaced apart side flanges and end flanges defining a generally rectangular form, a skin plate on said flanges, a groove on each of said end flanges and side flanges forming a continuous groove around the external periphery of the plate, said groove matching with a corresponding groove on each adjacent plate to form a continuous passage, an opening through at least one flange into said groove and a check valve means permitting fluid to be pumped into said passage but restricting its egress therefrom. Preferably I assemble the liner plates together to form a tunnel liner and pump a fluid resilient mass, such as liquid rubber, Thiokol, liquid plastics, etc. into the groove under pressure forcing it to follow the grooves to fill the continuous passage formed by the mating grooves.

In the foregoing general description of my invention, I have set out certain objects advantages, and purposes of my invention. Other objects, advantages and purposes will be apparent from a consideration of the following description and the accompanying drawings in which.

Figure 1:
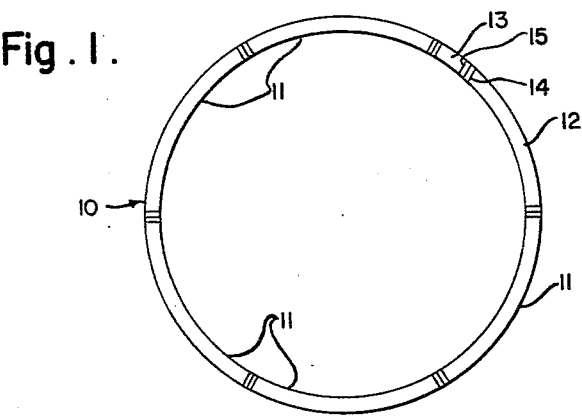
FIGURE 1 is a side elevational view of a complete tunnel liner ring.
Figure 2:
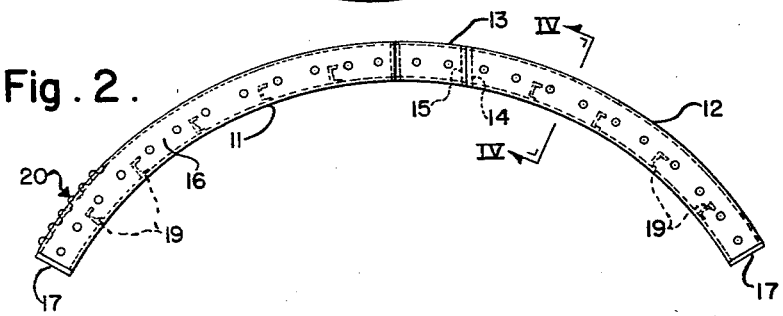
FIGURE 2 is an enlarged side elevation of a segment of the ring of FIGURE 1.
Figure 3:
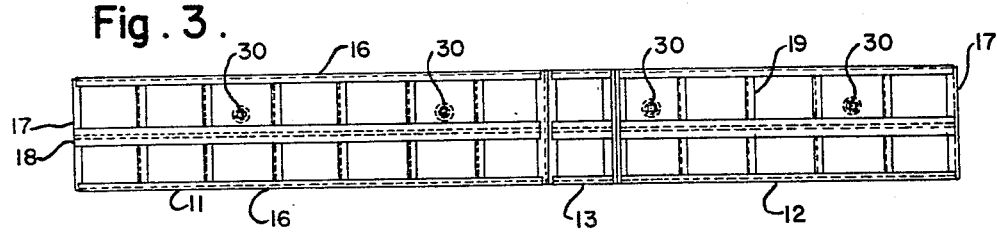
FIGURE 3 is a plan view of the inside of the segment of FIGURE 2.
Figures 4, 5:
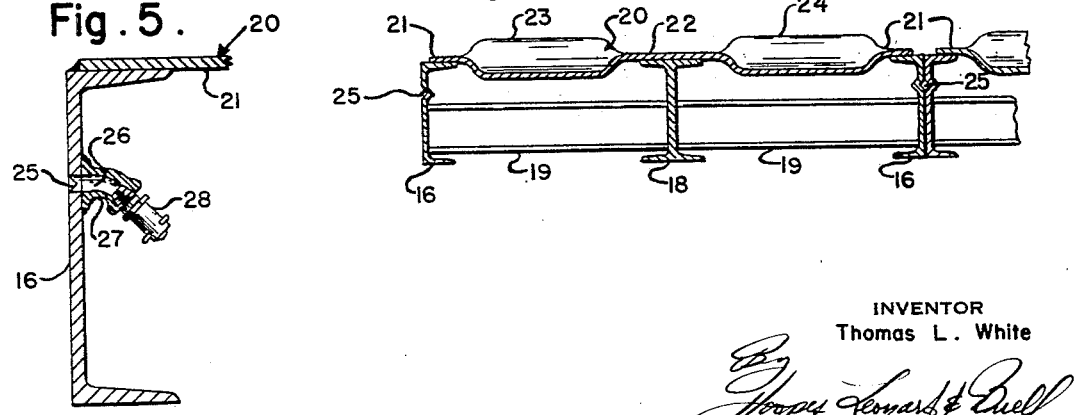
FIGURE 4 is a section on the line IV—IV of FIGURE 2.
FIGURE 5 is a fragmentary section through the valve assembly and side flange of a liner plate according to my invention.

Referring to the drawings, I have illustrated a complete tunnel ring element 10 made up of five standard liner plate segments 11 and a closing liner segment made up of two pieces 12 and 13 which have mating inclined end plates 14 and 15 which aid in the final insertion of the closing segment. Each liner plate segment and closing liner segment is made up of side flanges 16 and end flanges 17 welded together at the corners. Intermediate the side flanges 16, I provide a center rib 18 which may be an I-beam or similar reenforcing member. The side flanges 16 and I-beam 18 are bent to a curvature suitable for the tunnel at hand. A plurality of jacking members 19 are spaced apart normal to the side flanges 16. A skin plate 20 is applied to the flanges 16 and rib 18. Preferably the skin plate has non-corrugated edge flanges 21 which are welded to side flanges 16 and a central longitudinal non-corrugated center strip 22 which is welded to the center rib 18. This forms spaced apart corrugated segments 23 and 24. Each of the side flanges 16 and end flanges 18 is provided with a sealant groove 25 which communicates through opening 26 in the flanges with a gooseneck adapter 27 welded over opening 26 and carrying a pressure type grease fitting 28 (a spring loaded ball type check valve) preferably of the Alemite bayonet type. Sealant is pumped into the passage formed by adjoining grooves 25 of side-by-side plates making up the tunnel lining. A grout pumping opening 30 is provided at spaced points in the skin of the liner through which grout is pumped between the liner plates and the earthen walls of the tunnel in the usual manner.

The tunnel liner of this invention is installed in a tunnel by bolting end flanges of adjacent plates together to form a ring as in FIGURE 1. Successive side-by-side rings are bolted together through openings in the side flanges. Grout is pumped through the grout openings to fill the area between the outside of the liner ring and the earthen walls of the tunnel. The resilient fluid sealant is finally pumped through the check valve into the passages formed by the grooves in the end and side flanges of the liner plate, thus forming a resilient gasket in situ.

While I have set out certain preferred practices and embodiments of my invention in the foregoing specification, it will be obvious that this invention may be otherwise practiced and embodied within the scope of the following claims.

I claim:

1. A tunnel liner comprising a plurality of generally rectangular skin plates curved longitudinally, each having inwardly extending side flanges and end flanges, an inwardly extending groove on the outer surface of each side flange and end flange, said flanges being fastened together to form with the curved skin plates a cylindrical liner, said grooves of adjacent plates mating to form a continuous passage between the liner plates, an opening in at least one side and end flange of each plate communicating through said flange to said passage, check valve means communicating with said passage and a resilient rubber-like mass filling said passage under pressure and having been pumped therein through said check valve.

2. A tunnel liner as claimed in claim 1 wherein the check valve means is a spring loaded ball type pressure fitting.

3. A tunnel liner as claimed in claim 1 wherein each skin plate is provided with two series of spaced apart transversely directed corrugations separated by an intermediate flat longitudinal area substantially equidistant from the side flanges.

4. A tunnel liner as claimed in claim 1 having a central supporting rib extending between the end flanges and spaced intermediate the side flanges of each plate.

References Cited

UNITED STATES PATENTS

| | | | |
|---|---|---|---|
| 935,376 | 9/1909 | Lennon | 61—45 |
| 951,667 | 3/1910 | Vandevort | 61—45 |
| 2,160,342 | 5/1939 | Ribble | 61—45 |
| 2,238,566 | 4/1941 | Perrine | 61—45 |
| 2,325,087 | 7/1943 | Wertz | 61—36 |

FOREIGN PATENTS 313,510   6/1929   Great Britain.

JACOB SHAPIRO, *Primary Examiner.*